US009666108B2

(12) United States Patent
Morein et al.

(10) Patent No.: US 9,666,108 B2
(45) Date of Patent: May 30, 2017

(54) OPPORTUNISTIC COMPRESSION FOR DISPLAY SELF REFRESH

(71) Applicant: Synaptics Incorporated, San Jose, CA (US)

(72) Inventors: Stephen L. Morein, San Jose, CA (US); Jeffrey A. Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 166 days.

(21) Appl. No.: 14/582,438

(22) Filed: Dec. 24, 2014

(65) Prior Publication Data

US 2016/0189333 A1 Jun. 30, 2016

(51) Int. Cl.
*G06T 1/60* (2006.01)
*G09G 3/00* (2006.01)
*G09G 5/39* (2006.01)

(52) U.S. Cl.
CPC ................. *G09G 3/00* (2013.01); *G09G 5/39* (2013.01); *G09G 2340/02* (2013.01)

(58) Field of Classification Search
CPC .. G06T 1/60; G09G 2360/18; G09G 2360/12; G09G 2360/128
USPC ......................................................... 345/555
See application file for complete search history.

(56) References Cited

U.S. PATENT DOCUMENTS 8,587,600 B1 * 11/2013 Tischler ................. G09G 5/363 345/537
8,732,496 B2 5/2014 Wyatt
2008/0143695 A1 6/2008 Juenemann et al.
2012/0120083 A1 * 5/2012 Kong ..................... G09G 5/003 345/545
2012/0133659 A1 * 5/2012 Masnikosa ............ G06T 15/005 345/520
2012/0207208 A1 8/2012 Wyatt et al.
2012/0236013 A1 9/2012 Wyatt et al.
2013/0021352 A1 1/2013 Wyatt et al.
2013/0235055 A1 9/2013 Kim et al.
2013/0235941 A1 * 9/2013 Koo ....................... G09G 5/006 375/240.26
2013/0307835 A1 11/2013 Wu et al.

* cited by examiner

*Primary Examiner* — Gregory J Tryder
*Assistant Examiner* — Yuehan Wang
(74) *Attorney, Agent, or Firm* — Patterson + Sheridan, LLP

(57) ABSTRACT

A display device, a processing system, and a method are provided for updating a display device using self-refresh techniques. The described technique provides an indication to a host processor of whether a frame of display update data has been successfully compressed and stored entirely within a local frame buffer of the display. The host processor may invoke a self-refresh of the display for updating the display with a static display image, based on the received indications.

20 Claims, 3 Drawing Sheets

OPPORTUNISTIC COMPRESSION FOR DISPLAY SELF REFRESH

FIELD OF THE INVENTION

This invention generally relates to updating a display device.

BACKGROUND OF THE INVENTION

Display devices for updating images on a display screen are widely used in a variety of electronic systems. A typical display device includes a source that provides display data that is used to update the screen. The display data may be organized into display frames which are transmitted from the source to the display screen at a predefined rate. In one example, each display frame corresponds to an image to be displayed on the screen. The display screen may include display drivers that update the individual pixels on the display screen using the received display frames. The pixels in the display screen are typically assigned to one of the source drivers—e.g., the pixels in columns 1-5 are assigned to Source Driver 1, the pixels in columns 6-10 are assigned to Source Driver 2, and so forth.

BRIEF SUMMARY OF THE INVENTION

Embodiments described herein include a processing system for a display. The processing system includes a display memory, a compression module, and a display driver module. The compression module is configured to receive a first frame of display update data from a host processor coupled to the processing system, compress the first frame of display update data, and store the compressed first frame of display update data in the display memory. The display driver module is configured to update a display using the compressed first frame of display update data from the display memory. The processing system is configured to transmit a confirmation to the host processor indicating that the first frame of display update data was successfully compressed and stored in the display memory of the processing system.

Another embodiment of the present disclosure provides a method for operating a display device. The method includes receiving a first frame of display update data from a host processor, compressing the first frame of display update data, and storing the compressed first frame of display update data in a display memory. The method further includes responsive to determining the compressed first frame of display update data was entirely stored in the display memory, transmitting a confirmation to the host processor indicating that the first frame of display update data was successfully compressed. The method includes updating the display device using the compressed first frame of display update data from the display memory.

Embodiments described herein further provide a device having a host processor, and a processing system coupled to the host processor. The processing system includes a display memory, a compression module, and a display driver module. The compression module is configured to receive a first frame of display update data from the host processor, compress the first frame of display update data, and store the compressed first frame of display update data in the display memory. The display driver module is configured to update a display using the compressed first frame of display update data from the display memory. The processing system is configured to transmit a confirmation to the host processor indicating that the first frame of display update data was successfully compressed and stored in the display memory of the processing system.

Figure 1A:
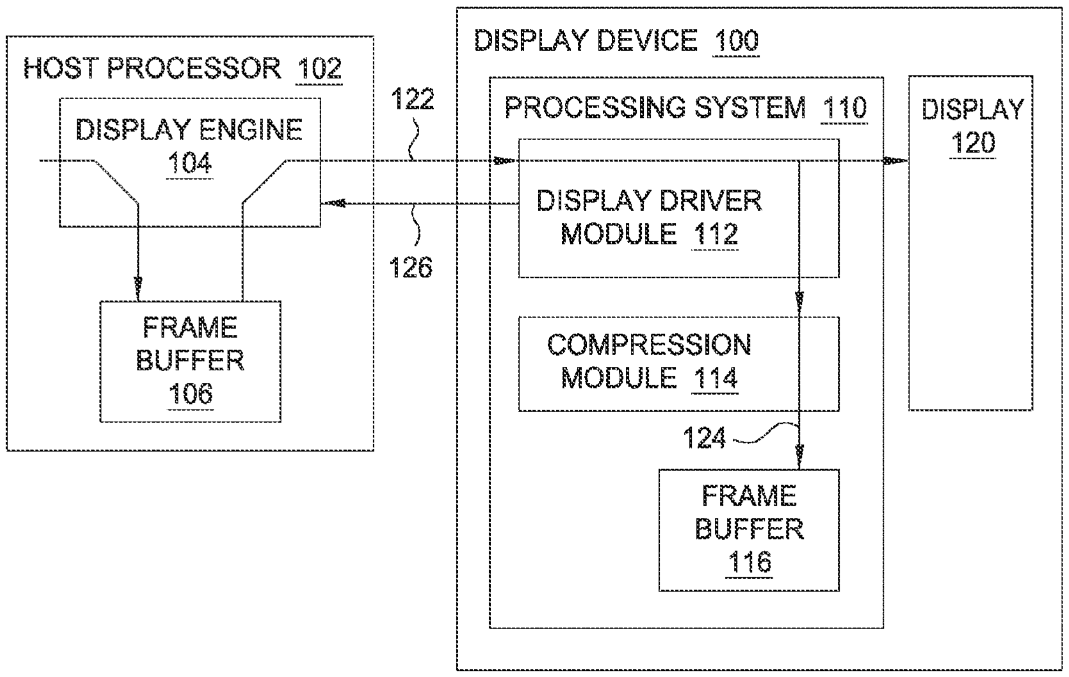
FIGS. 1A and 1B are block diagrams of an exemplary system that includes an input device in accordance with an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide display devices and methods that facilitate improved output display. Various embodiments of the present invention provide display devices and methods for updating a display. In one embodiment, frame(s) of display update data are compressed and stored in a local frame buffer of the display, which may be sized smaller than the frame buffer of the host processor providing the display update data. As the results of the compression may vary depending on the content of the display update data and the compression algorithm used, a processing system transmits indications after each display updating period of whether the frame was successfully compressed and stored in the local frame buffer. The host processor uses these indications to determine whether a self-refresh mode can be invoked at the processing system. For the next display frame, the processing system may continue to operate in a video mode and receive a new display frame from the host processor for the next frame. Alternatively, the processing system 110 may operate in a self-refresh mode wherein the host processor signals the processing system to use the compressed frame to refresh the display.

Figure 1B:
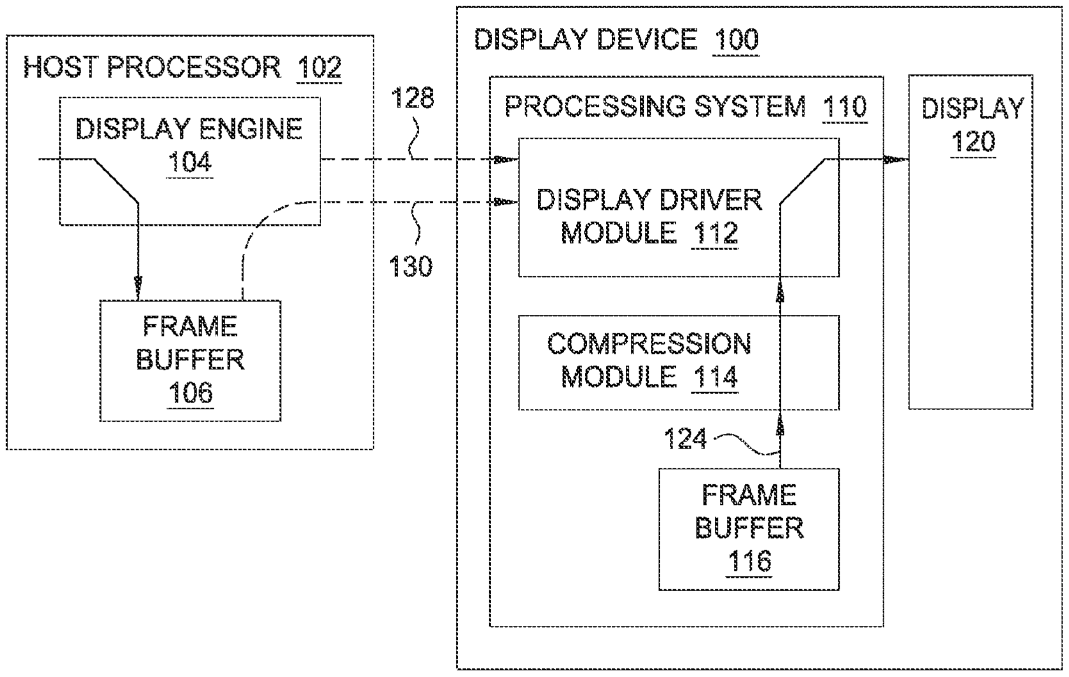

Turning now to the figures, FIGS. 1A and 1B are block diagrams of an exemplary display device 100, in accordance with embodiments of the invention. The display device 100 may be configured to display output from a host processor 102 of an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the display device 100.

The display device 100 can be implemented as a physical part of the electronic system, or can be physically separate from the electronic system. As appropriate, the display device 100 may communicate with parts of the electronic system using any one or more of the following: buses, networks, and other wired or wireless interconnections. Examples include $I^2C$, SPI, PS/2, Display Port, Universal Serial Bus (USB), Bluetooth, RF, and IRDA.

The display device 100 includes a processing system 110 and a display 120. The processing system 110 may be a timing controller, display controller, and the like. The processing system 110 may be part of an integrated circuit or system on a chip (SoC). Moreover, the processing system 110 may be disposed on the same substrate as the host processor 102 (e.g., mounted on the same PCB) or mounted on different substrates. The display 120 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

In one embodiment, the processing system 110 of the display device 100 is communicatively coupled to the host processor 102, which acts as a display source for the display device 100. The host processor 102 includes a display engine 104 and a frame buffer 106. The display engine 104 may be a graphics processing unit, a separate or integrated electronic system, and the like. The display engine 104 is configured to transmit frames of display update data to the processing system 110. The frame buffer 106 comprises system memory having a size sufficient to store one or more frames of display update data.

The processing system 110 includes a display driver module 112, a compression module 114, and a frame buffer 116. The display driver module 112 includes circuitry configured to provide display image update information to the display 120 of the display device 100 during display updating periods. The display driver module 112 may be included in or be separate from the processing system 110. In one embodiment, the processing system 110 comprises a first integrated controller comprising the display driver module 112, the compression module 114, and the frame buffer 116. In another embodiment, the processing system 110 comprises a first integrated controller comprising the display driver module 112 and a second integrated controller comprising the compression module and/or the frame buffer 116.

In one embodiment, the processing system 110 may be configured to operate in a first mode, referred to as a "video mode," in which the processing system 110 constantly refreshes the display 120 using display frames 122 provided by the host processor 102. The processing system 110 may be further configured to operate in a second mode, referred to as a "command mode" or a "self-refresh mode," in which the processing system maintains the display image on the display 120 using the frame buffer 116 and without further data from the host processor 102. For a static display image, the self-refresh mode allows for a lower power consumption as the host processor 102 does not need to re-send the frame buffer data and can remain in a low power state.

However, in embodiments having a high resolution display 120, challenges arise in implementing a self-refresh mode because the size of the frame buffer 116 becomes large enough to be cost prohibitive. Compression of the display frame data is one approach to overcome this problem, but suffers in that not all display images can be compressed sufficiently. Even if lossy compression is used, in which the image quality is reduced until the image can be compressed, lossy compression nonetheless limits the memory savings to be about 25% or 33% of the uncompressed display image. In many cases, display images can be compressed to a much larger degree, but this cannot be guaranteed, so frame buffer memory must be provisioned for the worst case scenario.

Accordingly, embodiments of the present disclosure support a self-refresh mode even for displays with high resolutions, where a full or half size frame buffer may not be affordable. In one embodiment, the frame buffer 116 may be a display memory having a size that is significantly smaller than a full frame buffer, e.g., the frame buffer 106 of the host processor 102. The compression module 114 is configured to receive frames of display update data from the host processor 102, compress, and store the frame of display update data in the frame buffer 116. The display driver module 112 is configured to update the display 120 using the frame of display update data stored in the frame buffer 116.

In the embodiment shown in FIG. 1A, the processing system 110 is configured to operate in a video mode in which, in parallel to the video data path, the compression module 114 attempts to compress the video stream. The compressed video stream (depicted as compressed data 124) is then stored in the local frame buffer 116. At the end of the frame, the processing system 110 transmits a message 126 back to the host processor 102 indicating whether the display frame has been successfully compressed and stored in the frame buffer 116. As used herein, a "successful" compression of a display frame refers to a compression process operating on a display frame to a degree such that the display frame in its compressed form fits entirely within the frame buffer 116.

The host processor 102 is configured to modify its operations with respect to the next display frame for the processing system 110 based on the indications of whether the previous display frame was completely compressed. That is, the host processor 102 is configured to opportunistically employ the self-refresh mode at the processing system 110 (if appropriate), or otherwise default to using the video mode. For example, for a next display frame, the processing system 110 may continue to operate in the video mode and receive a new display frame from the host processor 102 for the next frame. Alternatively, in the embodiment shown in FIG. 1B, the processing system 110 may operate in a self-refresh mode wherein the host processor 102 signals (depicted as arrow 128) the processing system 110 to use the compressed data 124 to refresh the display 120.

In some embodiments, the host processor 102 may signal to the processing system 110 to self-refresh using the display data contained in the frame buffer 116, even though the frame buffer 116 might not contain an entire display frame. In such cases, the host processor 102 may provide a remaining portion of the display frame (depicted as dashed arrow 130), which can be used in combination with the compressed data 124 to update the display 120.

Figure 2:
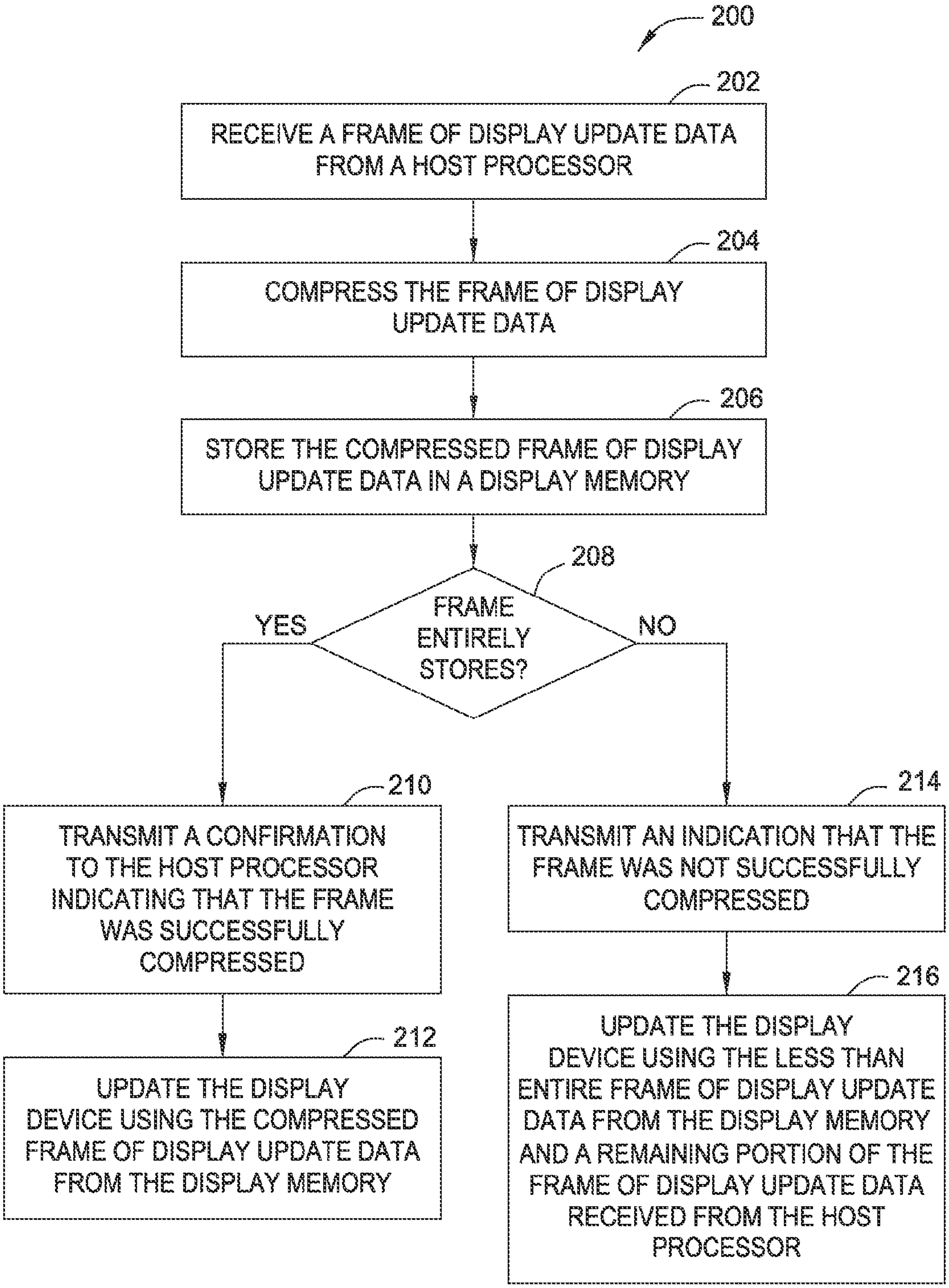
FIG. 2 is a flow diagram of a method for updating a display device, according to one embodiment of the present disclosure.

FIG. 2 is a flow diagram of a method 200 for updating a display device 100, according to one embodiment of the present disclosure. The method 200 begins at step 202, where the processing system 110 (e.g., by operation of the display driver module 112) receives a first frame of display update data from the host processor 102. The first frame may include at least a portion of a display frame which is used by the display driver module 112 to update the display 120.

At step 204, the processing system 110 (e.g., by operation of the compression module 114) compresses the first frame of display update data. In some embodiments, the compression module 114 receives and processes the first frame of display update data in parallel to the display driver module 112 receiving and using the first frame of display update data to update the display 120 (i.e., in the video mode of operation). In one implementation, the frame of display update data is compressed using a visually lossless algorithm such that a user cannot visually tell a difference between an image on the display 120 that was outputted using a compressed display frame or an uncompressed display frame. One such suitable compression algorithm is the Display Stream Compression (DSC) standard. However, the embodiments herein are not limited to visually lossless compression algorithms and may be used with any compression algorithm that compresses the display frame data.

While embodiments describe herein provide that compression of the frames of display update data is performed by a compression module 114 disposed within the processing system 110, it should be recognized that in some embodiments, the compression algorithm may be executed by the host processor 102 and the compressed frames are transmitted to the processing system 110. In such embodiments, in some cases, the compression algorithm executing on the host processor 102 may determine that the compressed frame will not fit on the frame buffer 116, and discard the compressed frame rather than transmit the frame.

At step 206, the processing system 110 stores the compressed frame of display update data in a display memory, such as the frame buffer 116. In some embodiments, the processing system 110 may compress and store the frame of display update data in a streaming fashion, where the compression module 114 stores a compressed chunk or portion of the frame prior to compressing another chunk of the display frame. Depending on the actual content of the display frame, as well as the compression algorithm used, the display frame in compressed form may or may fit entirely within the frame buffer 116.

As such, at step 208, the processing system 110 determines whether the compressed display frame has been entirely stored in the display memory (e.g., frame buffer 116). If so, at step 210, the processing system 110 transmits a confirmation to the host processor 102 indicating that the first frame of display update data has been successfully compressed in the frame buffer 116.

At step 212, for a next display update, the processing system 110 (e.g., by execution of the display driver module 112) updates the display device 100 using the compressed first frame of display update data retrieved from the display memory (frame buffer 116). The processing system 110 (e.g., by execution of the compression module 114) retrieves and decompresses the display frame from the frame buffer 116. In some embodiments, the processing system 110 receives an indication or signal from the host processor 102 to operate in a self-refresh mode, i.e., indicating that a static display image may be updated using the compressed display frame stored in the frame buffer 116. In some embodiments, the processing system 110 may be configured to generate display update timing based on the compressed first frame of display update data.

It should be recognized that in some cases, the host processor 102 may continue to operate in a video mode of operation, in which the processing system 110 receives a second frame of display update data from the host processor 102. In such cases, the processing system 110 (e.g., by execution of the compression module 114) compresses the second frame of display update data and replaces the compressed display update data in the display memory with the compressed second frame of display update data.

At step 214, responsive to determining that less than an entirety of the first frame of display update data was compressed and stored in the display memory, the processing system 110 transmits an indication to the host processor 102 that the first frame of display update data was not successfully compressed. In embodiments where compression and storage of the display update data is performed in a streaming fashion, the compression module 114 may be configured to halt compression of the first frame of display update data in response to determining that the display memory is full.

At step 216, for a next display update, the processing system 110 (e.g., by execution of the display driver module 112) updates the display device 100 using the less than entire first frame of display update data from the display memory and a remaining portion of the first frame of display update data received from the host processor 102.

Figure 3A:
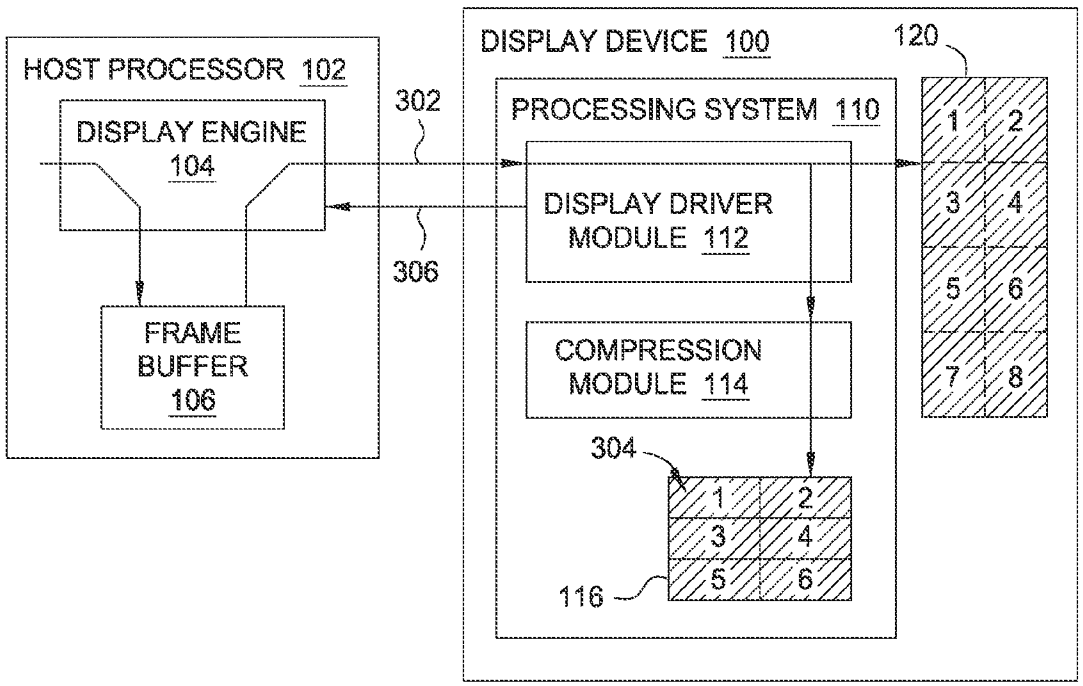
FIGS. 3A and 3B are block diagrams of the display device performing opportunistic self-refresh of a display, in accordance with another embodiment of the present disclosure.
Figure 3B:
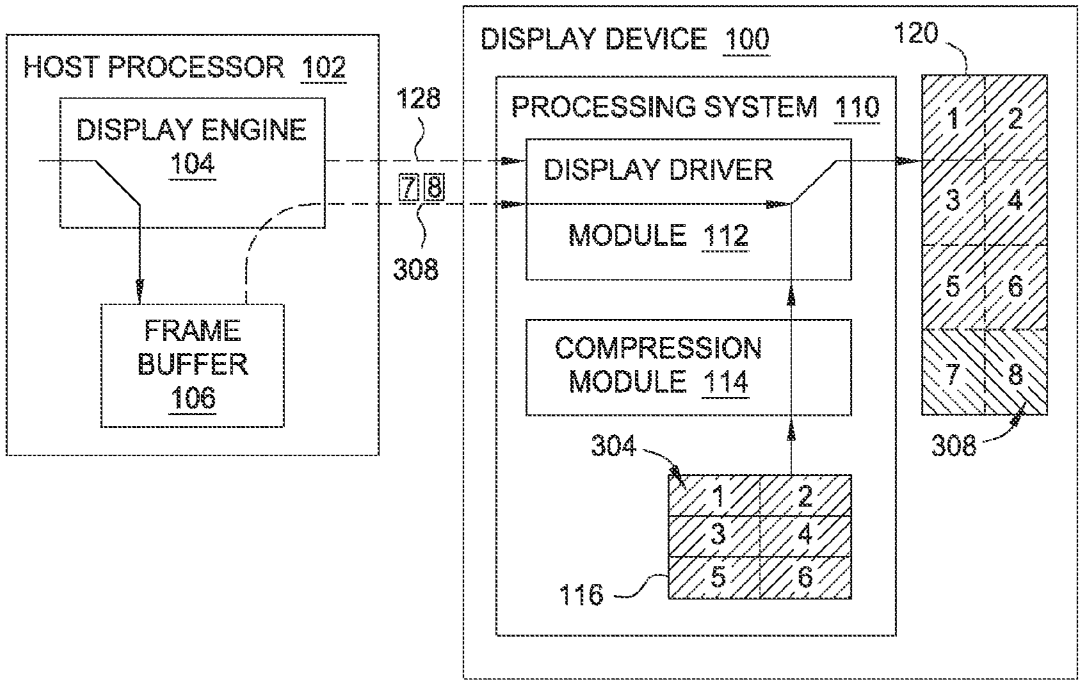

FIGS. 3A and 3B are block diagrams of the display device 100 performing opportunistic self-refresh of a display, in accordance with another embodiment of the present disclosure. In one or more embodiments, each frame of display update data may be organized into a plurality of sections corresponding to portions of the display 120. In the embodiment shown, the frame of display update data is organized into eight sections (identified as section 1, 2, 3, . . . 8), although any number or geometry of sections and divisions may be used.

As shown in FIG. 3A, the compression module 114 attempts to compress and store a frame 302 of display update data received from the host processor 102. The compression module 114 is able to fit sections 1, 2, 3, 4, 5, and 6 of the compressed display update data 304 into the frame buffer 116, but has insufficient space for fitting sections 7 and 8 of display update data. The processing system 110 transmits an indication 306 that a frame of display update data was not successfully compressed and that identifies which of the sections of the frame of display update data were successfully compressed, were not successfully compressed, or both. For example, the processing system 110 transmits an indication 306 that the sections 1, 2, 3, 4, 5, and 6 have been successfully compressed, but not sections 7 and 8 of the display update data.

In FIG. 3B, at a next display updating period, the display engine 104 might determine the next display frame is the same as the previous display frame (i.e., a static display image), which is the appropriate scenario for a self-refresh mode of updating the display 120. However, the host processor 102 knows the frame buffer 116 of the display device 100 does not have a complete copy of the previous display frame, based on the indication 306 received from the processing system 110 in the prior display updating period. In one approach, the host processor 102 may forego self-refresh mode altogether and transmit the entire frame of display update data in the video mode of operation. Alternatively, the host processor 102 may transmit a signal (arrow 128) indicating the processing system 110 should self-refresh using what display update data is compressed and stored in the frame buffer 116, in conjunction with transmitting remaining portions 308 of the display update data that were not stored in the frame buffer 116. In the example shown, the host processor 102 transmits just sections 7 and 8 of the display update data, instead of all sections 1 to 8, to the processing system 110. As such, the display driver module 112 updates the display 120 using the portions of the frame of display update data stored in frame buffer 116 and the portions of the frame of display update data provided by the host processor 102.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for a display, the processing system comprising:

a display memory;

a compression module comprising compression circuitry and configured to receive a first frame of display update data from a host processor coupled to the processing system, compress the first frame of display update data according to a predefined compression algorithm, and store the compressed first frame of display update data in the display memory; and a display driver module comprising display circuitry and configured to:

transmit, responsive to determining that an entirety of the first frame was compressed and stored in the display memory, a confirmation signal to the host processor;

transmit, responsive to determining that a first portion of the first frame that is less than the entirety of the first frame was compressed and stored in the display memory, an indication signal identifying a second portion of the first frame that was not compressed and stored; and update the display using the compressed first portion of the first frame from the display memory, and the second portion of the first frame of display update data received from the host processor.

2. The processing system of claim 1, wherein the compression module is configured to receive the first frame of display update data in parallel to the display driver module receiving the first frame of display update data.

3. The processing system of claim 1, wherein updating the display using the compressed first frame of display update data is performed in response to receiving an indication from the host processor to operate in a self-refresh mode.

4. The processing system of claim 1, wherein the processing system is further configured to:

receive a second frame of display update data from the host processor;

compress the second frame of display update data; and replace the compressed first frame of display update data in the display memory with the compressed second frame of display update data.

5. The processing system of claim 1, wherein the compression module is configured to, responsive to determining that the display memory is full, halt compression of the first frame of display update data.

6. The processing system of claim 1, wherein the display driver module is configured to generate display update timing based on the compressed first frame of display update data.

7. The processing system of claim 1, wherein the first frame of display update data is organized into a plurality of sections, wherein identifying the second portion of the first frame that was not successfully compressed comprises identifying which of the plurality of sections of the first frame were successfully compressed.

8. The processing system of claim 1, wherein the display driver module, the compression module, and the display memory are included within a common integrated circuit.

9. The processing system of claim 1, wherein the display driver module is included within a first integrated circuit, and wherein the compression module and the display memory are included within a second integrated circuit coupled with the first integrated circuit.

10. The processing system of claim 1, wherein the predefined compression algorithm comprises a visually lossless compression algorithm.

11. A method for operating a display device coupled with a host processor, the method comprising:

receiving a first frame of display update data from a host processor;

attempting to compress and store, in a display memory, an entirety of the first frame of display update data;

transmitting, responsive to determining that a first portion of the first frame that is less than the entirety of the first frame was compressed and stored in the display memory, an indication signal to the host processor identifying a second portion of the first frame that was not compressed and stored; and updating, upon receiving the second portion of the first frame from the host processor, the display device using the compressed first portion of the first frame from the display memory and the received second portion.

12. The method of claim 11, wherein the updating the display device using the compressed first portion of the first frame is performed in response to receiving an indication from the host processor to operate in a self-refresh mode.

13. The method of claim 11, further comprising:

receiving a second frame of display update data from the host processor;

compressing the second frame of display update data; and replacing the compressed first portion of the first frame of display update data in the display memory with the compressed second frame of display update data.

14. The method of claim 11, wherein attempting to compress and store an entirety of the first frame of display update data comprises:

responsive to determining that the display memory is full, halting compression of the first frame of display update data.

15. The method of claim 11, wherein the first frame of display update data is organized into a plurality of sections, wherein identifying the second portion of the first frame was not successfully compressed comprises identifying which of the plurality of sections of the first frame were successfully compressed.

16. A device comprising:

a host processor; and a processing system coupled to the host processor and comprising:

a display memory;

a compression module comprising compression circuitry and configured to receive a first frame of display update data from the host processor, compress the first frame of display update data according to a predefined compression algorithm, and store the compressed first frame of display update data in the display memory; and a display driver module comprising display circuitry and configured to:

transmit, responsive to determining that a first portion of the first frame that is less than the entirety of the first frame was compressed and stored in the display memory, an indication signal identifying a second portion of the first frame that was not compressed and stored; and update the display using the compressed first portion of the first frame from the display memory, and the second portion of the first frame of display update data received from the host processor.

17. The device of claim 16, wherein the host processor is configured to:

responsive to receiving an indication that the entirety of the first frame of display update data was successfully compressed, transmitting an indication to the processing system to operate in a self-refresh mode comprising updating the display using the compressed first frame of display update data in the display memory; and responsive to receiving the indication signal, transmitting the second portion of the first frame of display update data to the processing system.

18. The device of claim 16, wherein the compression module is configured to, responsive to determining that the display memory is full, halt compression of the first frame of display update data.

19. The device of claim 16, wherein the display driver module is configured to generate display update timing based on the compressed first portion of the first frame of display update data.

20. The device of claim 16, wherein the first frame of display update data is organized into a plurality of sections, wherein identifying the second portion of the first frame that was not successfully compressed comprises identifying which of the plurality of sections of the first frame were successfully compressed.

* * * * *